(12) United States Patent
Alles et al.

(10) Patent No.: US 10,603,660 B2
(45) Date of Patent: Mar. 31, 2020

(54) MODULAR REACTOR

(71) Applicant: INNOVATIVE THERMOANALYTIC INSTRUMENTS KG, Hettenleidelheim (DE)

(72) Inventors: Andrea Alles, Hettenleidelheim (DE); Keith Stuart, Canvey Island (GB)

(73) Assignee: INNOVATIVE THERMOANALYTIC INSTRUMENTS KG, Hettenleidelheim (DE)

( * ) Notice: Subject to any disclaimer, the term of this patent is extended or adjusted under 35 U.S.C. 154(b) by 321 days.

(21) Appl. No.: 15/509,711

(22) PCT Filed: Sep. 8, 2015

(86) PCT No.: PCT/EP2015/070447
§ 371 (c)(1),
(2) Date: Mar. 8, 2017

(87) PCT Pub. No.: WO2016/038006
PCT Pub. Date: Mar. 17, 2016

(65) Prior Publication Data
US 2017/0304820 A1    Oct. 26, 2017

(30) Foreign Application Priority Data
Sep. 8, 2014  (DE) ........................ 10 2014 013 344

(51) Int. Cl.
*B01L 3/00*   (2006.01)
(52) U.S. Cl.
CPC ..... *B01L 3/5025* (2013.01); *B01J 2219/0002* (2013.01); *B01L 2200/028* (2013.01); *B01L 2200/04* (2013.01)
(58) Field of Classification Search
CPC .............. B01L 3/5025; B01L 2200/04; B01L 2200/028; B01J 2219/0002
See application file for complete search history.

(56) References Cited

U.S. PATENT DOCUMENTS

| | | | |
|---|---|---|---|
| 5,083,364 A | * | 1/1992 | Olbrich ............ H01L 21/67196 118/719 |
| 6,942,785 B2 | | 9/2005 | Bayer et al. |
| 2010/0075425 A1 | | 3/2010 | Hofmann et al. |

FOREIGN PATENT DOCUMENTS

| | | |
|---|---|---|
| DE | 19855256 A1 | 6/2000 |
| DE | 19917398 A1 | 10/2000 |

(Continued)

OTHER PUBLICATIONS

PCT International Preliminary Report on Patentability dated Dec. 21, 2016, Application No. PCT/EP2015/070447, 10 pages.

(Continued)

*Primary Examiner* — Dennis White
(74) *Attorney, Agent, or Firm* — Brooks Kushman P.C.

(57) ABSTRACT

A modular device for treatment and/or analysis of substances comprises a supply device which supplies at least one functional fluid to at least one process device, wherein the supply device has multiple receiving means for receiving in each case one process device. The receiving means each have multiple supply ports, including an inflow supply port and an outflow supply port for transmission of a functional fluid. The process device has a functional region for the treatment and/or analysis of substances, a fluid line which encloses the functional region, and multiple coupling means for coupling to the supply ports of a receiving means. For each receiving means, a first valve device is provided in the region of the inflow supply port and a second valve device is provided in the region of the outflow supply port.

11 Claims, 5 Drawing Sheets

(56) References Cited

FOREIGN PATENT DOCUMENTS

| | | | |
|---|---|---|---|
| DE | 19917398 C2 * | 6/2002 | ............ B01J 19/004 |
| GB | 2475835 A | 6/2011 | |
| WO | WO-0062919 A1 * | 10/2000 | ............ B01J 19/004 |
| WO | 02065221 A2 | 8/2002 | |
| WO | 2008052758 A1 | 5/2008 | |
| WO | 2015085262 A1 | 6/2015 | |

OTHER PUBLICATIONS

European Office Action dated Jul. 9, 2019, Application No. 15 771 046. 8 - 1101, Applicant Innovative ThermoAnalytic Instruments KG, 7 Pages.

* cited by examiner

MODULAR REACTOR

CROSS-REFERENCE TO RELATED APPLICATION

This application is the U.S. national phase of PCT Application No. PCT/EP2015/070447 filed on Sep. 8, 2015, which claims priority to German Patent Application No. DE 102014013344.3 filed on Sep. 8, 2014, the disclosures of which are incorporated in their entirety by reference herein.

TECHNICAL FIELD

The invention at hand relates to a modular device for the treatment and/or analysis of substances, and in particular to a reactor.

BACKGROUND

Common reactors have a plurality of treatment devices, which, in the case of a defect of a treatment device, can only be replaced in an extremely extensive process. In the case of a defective treatment device, the user must thus turn off the reactor, whereby possible examinations in other treatment devices of the reactor are interrupted or must be interrupted, respectively. The defective treatment device must furthermore be removed from a cooling fluid circuit. The cooling fluid circuit must then be closed by means of a corresponding structural measure or an alternative or repaired treatment device, respectively, must be installed to take the place of the defective treatment device. The steps, which must be taken with regard to the cooling fluid circuit, must also be taken for the electronic connection of the treatment device.

It is furthermore necessary to hold a plurality of different reactors available, because every reactor is designed for a certain type or design, respectively, of treatment devices, whereby the treatment devices of a first design cannot be used with a further reactor, which comprises treatment devices of another design.

SUMMARY

It is thus the object of the invention at hand to provide a device for the treatment and/or analysis of substances, which provides shorter downtimes as compared to common reactors. The use of the device for the treatment and/or analysis of substances is to furthermore be easier and more flexible.

According to claim 1, the above-mentioned object is solved by means of a modular device for the treatment and/or analysis of substances. The modular device for the treatment and/or analysis of substances according to the invention preferably comprises at least one supply device and at least one process device for the treatment and/or analysis of substances, wherein the supply device has a plurality of receiving means for receiving in each case one process device, wherein the receiving means in each case have a plurality supply ports, wherein the supply ports of at least two receiving means are arranged so as to be oriented identically to one another, wherein each receiving means has at least two supply ports for the transmission of a functional fluid, wherein the process device has a functional region for the treatment and/or analysis of substances, a fluid line, which encloses the functional region at least in sections or which is adjacent thereto, respectively, and a plurality of coupling means for coupling to the plurality of supply ports of the receiving means, wherein, by means of an inflow coupling means and an outflow coupling means, fluid communication between an inflow supply port for feeding the functional fluid to the process device and an outflow supply port for receiving the functional fluid to be led out of the process device can be created via the fluid line, wherein a first valve device is provided in the region of the inflow supply port and a second valve device is provided in the region of the outflow supply port, wherein the first valve device can be actuated by means of the inflow coupling means and the second valve device can be actuated by means of the outflow coupling means, wherein the first valve device and the second valve device of a receiving means are closed when the receiving means is decoupled from a process device, and wherein the first valve device and the second valve device of the receiving means are open when the receiving means is coupled to a process device. The first valve device and the second valve device of a receiving means are preferably closed, in particular in an automatic or self-actuating manner when the receiving means is decoupled from a process device, and the first valve device and the second valve device of the receiving means are preferably opened, in particular in an automatic or self-actuating manner when the receiving means is coupled to a process device.

This solution is advantageous, because a type of "plug and play" solution is provided for the first time, according to which one or a plurality of process device(s) can be decupled from the supply device by the user or in a factory, in particular during the operation of the modular device, in particular without using tools. It goes without saying that this also applies to the coupling of process devices of different designs. The individual process devices can thus be coupled into or decoupled from, respectively, the fluid line and a data, energy and/or signal supply line in a very simple manner, in particular in one step.

The modular setup of the device according to the invention is further advantageous, because the device can thus be assembled or disassembled, respectively, easily. Process devices of a different design can furthermore be operated in one device. This also makes it possible that the process devices can be updated or that the device can be supplemented, respectively, by one or a plurality of new or other or specific process devices or accessories.

Further preferred embodiments are the subject matter of the description below or of the subclaims.

According to a preferred embodiment of the invention at hand, for generating the coupling between the first valve device and the inflow coupling means the inflow coupling means can be positioned in such a manner with respect to the first valve device that a fluid-tight connection is created between the first valve device and the inflow coupling means, wherein, while maintaining the fluid-tight connection, a displacement movement of the inflow coupling means can be effected in such a manner with respect to the first valve device that, by means of a contact with the inflow coupling means, a locking part of the valve device can be deflected from a position, which prevents fluid communication from the supply device, into a position, which allows for fluid communication from the supply device, and, for creating the coupling between the second valve device and the outflow coupling means, the outflow coupling means can be positioned in such a manner with respect to the second valve device that a fluid-tight connection between the second valve device and the outflow coupling means is created, wherein, while maintaining the fluid-tight connection, a displacement movement of the outflow coupling means can be effected in such a manner with respect to the second valve device that a locking part of the valve device can be deflected by means of a contact with the outflow coupling means from a position, which prevents a fluid communication into the supply device, into a position, which allows for a fluid communication into the supply device. This embodiment is advantageous, because an extremely loss-free device, which can be operated with little need for cleaning is provided without or with only very small leakage losses, respectively.

According to a further preferred embodiment of the invention at hand, the receiving means in each case have at least one data, energy and/or signal supply port, wherein the data, energy and/or signal supply ports of the individual receiving means are in each case arranged identically with respect to the inflow supply ports and the outflow supply ports of the respective receiving means, wherein the process device has a data, energy and/or signal coupling means, which is arranged in such a manner that a data, energy and/or signal exchange can be effected via a data, energy and/or signal supply port of a receiving means when the inflow supply port is coupled to the inflow coupling means and when the outflow supply port is coupled to the outflow coupling means of the same receiving means. This embodiment is advantageous, because uniform port arrangements are provided, whereby the process device can be positioned arbitrarily.

According to a further preferred embodiment of the invention at hand, the supply device has at least two rows, each comprising a plurality of adjacent receiving means, wherein preferably at least two and particularly preferably at least or exactly five receiving means are provided per row, wherein at least the receiving means of one row are connected to a common feed line for feeding the functional fluid and to a common discharge line for discharging the functional fluid, all receiving means are preferably connected to the same feed line and to the same discharge line. This embodiment is advantageous, because the effort with respect to the lines to be provided or to be created, respectively, is kept small.

According to a further preferred embodiment of the invention at hand, provision is made for at least two process devices, which differ structurally and/or functionally, wherein functionally corresponding coupling means of both process devices are arranged so as to be oriented identically to one another and/or provision is made for a plurality of process devices, which are embodied in a structurally or functionally identical manner. This embodiment is advantageous, because different functions or effects can be effected by means of different process devices, without having to operate a plurality of reactors. This is extremely advantageous with regard to the space requirements, the energy requirement, the maintenance and the acquisition costs.

According to a further preferred embodiment of the invention at hand, a control device is provided or arranged or can be arranged in or on the supply device, wherein the control device can identify the individual process devices independent from the respective receiving means and wherein the individual process devices can be controlled and/or read by means of the control device, wherein the data, energy and/or signal supply ports of the individual receiving means are connected to the control device. This embodiment is advantageous, because a monitoring of the individual treatment and/or analysis steps can be carried out by means of the control device, whereby adaptations to the respective treatment and/or analysis steps can preferably be made in real time.

According to a further preferred embodiment of the invention at hand, the control device can be operated by means of an input and display device, wherein the control device and the input and display device can be connected to one another wirelessly for the exchange of data, wherein the input and/or display device is preferably embodied as touch screen. This embodiment is advantageous, because a highly comfortable and flexible operation of the modular device is possible.

According to a further preferred embodiment of the invention at hand, the supply device preferably comprises at least one main fluid inlet for introducing the functional fluid into the device, and a main fluid outlet for letting the functional fluid out of the device and/or a power connection for energy absorption and/or a data interface for reading and/or controlling the device and/or an interface for connecting a multi-channel thermometer and/or a multi-channel infrared circuit board. This embodiment is advantageous, because the device can be adapted/supplemented to changed ambient conditions or user demands in a highly flexible manner.

The invention at hand further refers to a supply device for use in a modular device according to claim 1. The supply device hereby preferably comprises at least a plurality of receiving means for receiving in each case one process device, wherein the receiving means in each case have a plurality supply ports, wherein the supply ports of at least two receiving means are arranged so as to be oriented identically to one another, wherein each receiving means has at least two supply ports for the transmission of a functional fluid, wherein a supply port is embodied as inflow supply port for feeding the functional fluid to a process device, which can be coupled to the receiving means, and a supply port is embodied as outflow supply port for receiving the functional fluid to be led out of the couplable process device, wherein a first valve device is provided in the region of the inflow supply port and a second valve device is provided in the region of the outflow supply port, wherein the first valve device and the second valve device of a receiving means are closed when the receiving means is decoupled from a process device, and wherein the first valve device and the second valve device of the receiving means are open when the receiving means is coupled to a process device.

The invention at hand preferably furthermore relates to a process device for the treatment and/or analysis of substances for use in a modular device according to claim 1. The process device preferably comprises at least one functional region for the treatment and/or analysis of substances, a fluid line, which encloses the functional region at least in sections, and a plurality of coupling means for coupling to a plurality of supply ports of a receiving means of a supply device, wherein, by means of an inflow coupling means and an outflow coupling means, fluid communication between an inflow supply port and an outflow supply port for receiving the functional fluid to be led out of the process device can be created by means of an inflow coupling means and an outflow coupling means via the fluid line.

It is furthermore conceivable or preferred, respectively, that the process devices and/or the supply devices is/are partially or in each case equipped with a safety device or a closure device, respectively, or a locking device, respectively, whereby an unauthorized removal or undesired removal of one or a plurality of process device(s) from the supply device can be prevented. It is further conceivable or preferred, respectively, that when connecting a process device to the supply device or when decoupling the process device from the supply device, the safety device or closure device, respectively, or locking device, respectively, supports this. The safety device or closure device, respectively, or locking device, respectively, can thus form a guide, e.g. by means of which the process device is transferred directly into a corresponding orientation and/or position.

It is furthermore possible that the modular device supports the use of cameras inside the process devices. The process devices can thus preferably be equipped later with a camera. The main circuit arrangement of the modular device further also has corresponding interfaces for supplementing the supply device with corresponding components. Preferably, this makes it possible to make the reactions, which occur in the process device, capable of being output optically via a display device, in particular the input and/or output device.

The control device is preferably designed in such a manner that one or a plurality of calorimetric algorithms, in particular for determining a required methodology, in particular in response to expanding the tests or analyses and/or treatments, can be determined and/or output and/or selected.

The use of the word "substantially" in all cases, in which this word is used in the context of the property right at hand, preferably defines a deviation in the range of 1%-30%, in particular of 1%-20%, in particular of 1%-10%, in particular of 1%-5%, in particular of 1%-2%, from the provision, which would be at hand without the use of this word.

Individual or all illustrations of the figures described below are to preferably be considered to be design drawings, i.e. the dimensions, proportions, functional contexts and/or arrangement resulting from the figure or the figures, respectively, preferably correspond exactly or preferably substantially to those of the device according to the invention or of the product according to the invention, respectively.

Further advantages, goals and characteristics of the invention at hand will be explained by means of the below description of the attached drawings, in which modular devices according to the invention for the treatment and/or analysis of substances or the components thereof are illustrated in an exemplary manner. Elements of the modular device according to the invention for the treatment and/or analysis of substances, which correspond at least substantially in the figures with respect to their function, can hereby be identified with the same reference numerals, wherein these components or elements, respectively, do not need to be numbered or explained, respectively, in all of the figures. The invention will be explained below merely in an exemplary manner by means of the enclosed figures.

DETAILED DESCRIPTION

Figure 1:
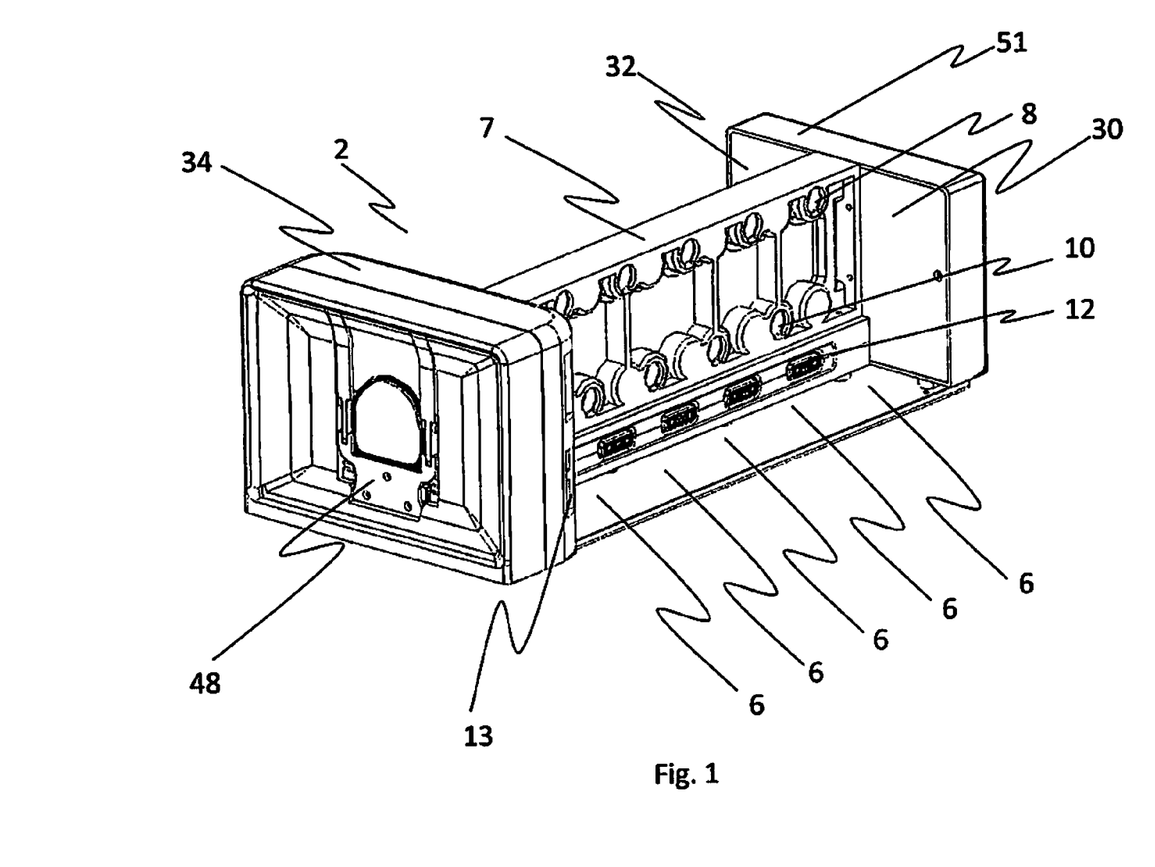
FIG. 1 shows a perspective illustration of a supply device.

FIG. 1 shows a supply device 2, as it is preferably used according to the invention at hand. The supply device 2 thereby preferably represents a frame device, on which further devices can be arranged. Preferably, the supply device 2 is preferably at least partially created by means of a casting process and/or injection molding process. The further devices are hereby preferably process devices 4 (see FIG. 2). The process devices 4 are preferably coupled to the supply device 2 via receiving means 6. The supply device 2 preferably has a plurality of receiving devices 6, which are particularly preferably embodied so as to be uniform. A receiving device 6 thereby preferably provides supply ports 8, 10, 12 as well as a receiving region for arranging a process device 4.

The illustrated supply device 2 has two rows 30, 32 of receiving devices 6, which are separated from one another by means of a wall device 7. It is hereby possible, however, that the supply device 2 is embodied with only one row or with at least two or more than two rows. The wall device 7 has one or a plurality of lines for guiding a functional fluid or embodies one or a plurality of lines for guiding the functional fluid.

The device identified with reference numeral 8 is preferably an inflow support port and the device identified with reference numeral 10 is preferably an outflow supply port 10. Depending on the embodiment, it is also possible hereby, however, that reference numeral 8 identifies the outflow supply port and that reference numeral 10 identifies the inflow supply port. The inflow supply port 8 preferably has a first valve device 24 (see FIG. 3), via which the functional fluid can be introduced into the process device 4 when the process device 4 is coupled. The outflow supply port 10 furthermore preferably has a second valve device 26 (see FIG. 3), which can be guided from the process device 4 into the supply device 2 when the process device 4 is coupled. Provision is preferably made below the valve devices, in particular in the bottom region of the supply device, preferably in each case for a data, energy and/or signal supply port 12. The data, energy and/or signal supply ports 12 are preferably a part of a data, energy and/or signal supply bus line 12. It can be gathered from the illustration that the inflow supply port 8, the outflow supply port 10 and the data, energy and/or signal supply port 12 are arranged or embodied, respectively, so as to be oriented identically to one another in the case of at least two receiving means 6 and preferably in the case of all receiving means 6.

In the illustrated case, the supply device 2 has two rows 30, 32, in each case comprising five receiving devices 6. Each receiving device 6 comprises two valve devices 24, 26, whereby each row 30, 32 has ten or at least or exactly ten valve devices.

Figure 2:
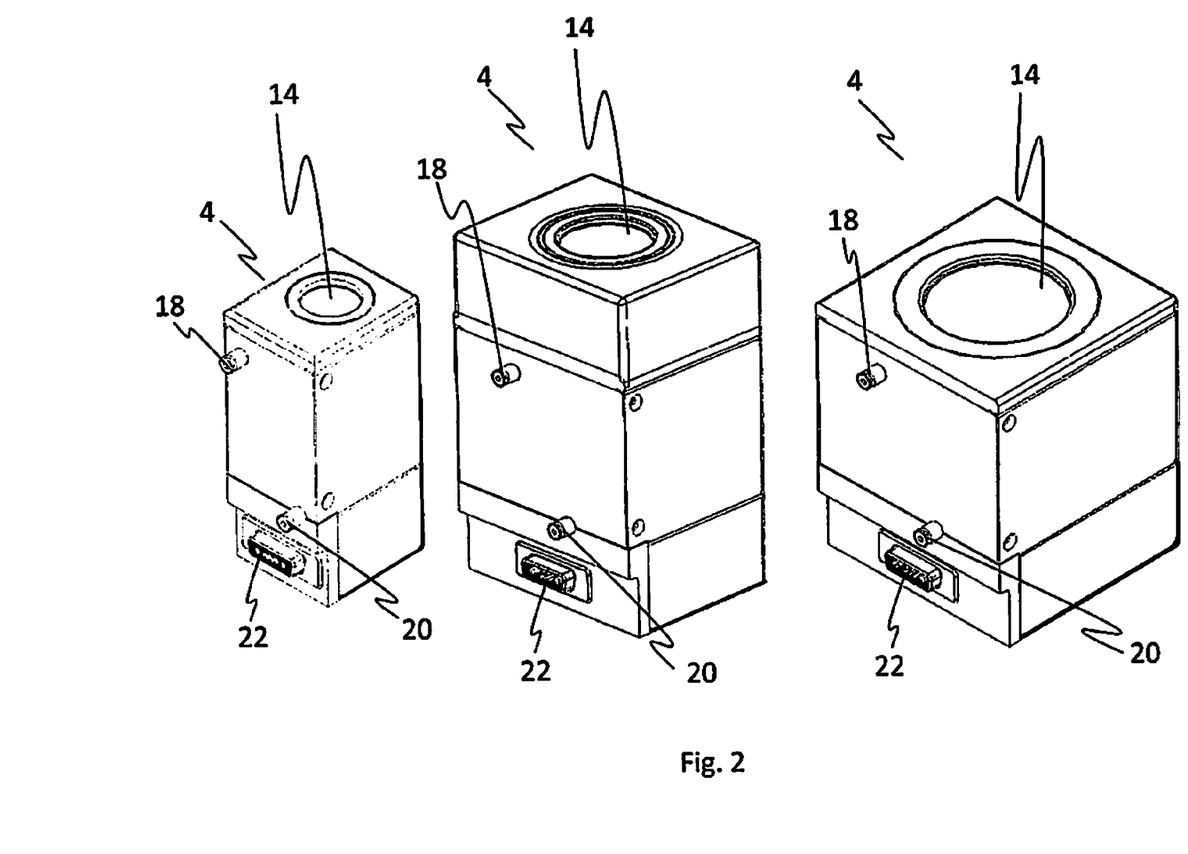
FIG. 2 shows a plurality of different perspective illustrations of process devices.

FIG. 2 shows three different process devices 4. The process devices 4 in each case have coupling means 18, 20, 22, which are oriented identically to one another. This is advantageous, because the different process devices 4 can thus be coupled to the supply device 2 at arbitrary receiving means 6. The inflow coupling means 18 is designed in such a manner that it can interact with the inflow supply port 8. The outflow coupling means 20 is likewise designed in such a manner that it can interact with the outflow supply port 10 (see FIG. 1). It goes without saying that it is possible hereby that it is not the inflow coupling means, but the outflow coupling means, which is arranged in the place of reference numerals 18, depending on the design of the fluid supply.

The first process device 4 preferably has a cooling and/or heating device. The functional range 14 of the first process device 4 is preferably embodied as a hollow space, which is functionally coupled to the cooling and/or heating device, for receiving objects and which has a diameter of preferably more than 15 mm or of more than 16 mm or of more than 17 mm or of more than 18 mm or of more than 19 mm or of more than 20 mm or of more than 21 mm, in particular of up to 30 mm or of up to 29 mm or of up to 28 mm or of up to 27 mm or of up to 26 mm, in particular of 25 mm or of substantially 25 mm or of exactly 25 mm. The first process device 4 (left process device) preferably has at least one slave printed circuit board arrangement and/or at least one power/communications interface and/or at least one heat exchanger and/or a USB interface. Preferably, the first process device 4 additionally or alternatively has an aluminum heating block and/or a Peltier cooling element and/or a resistance heater and/or one or a plurality of sensor elements, in particular a temperature sensor element, in particular a Pt100 block temperature sensor element. The heat exchanger is preferably coupled to a fluid line, through which the functional fluid, in particular cooling water, which is provided by the supply device 2, is guided through the process device 4, in particular for discharging latent heat out of the process device. The slave printed circuit board arrangement preferably has a power and/or communications interface to the data, energy and/or signal supply bus line 12. Furthermore, a data protocol, in particular a USB protocol, is preferably used to provide a "plug and play" functionality. Thanks to the "plug and play" functionality, the process device 4 can be digitally controlled and/or operated and/or manipulated and/or read at any receiving means 6. The first or left process device 4, respectively, preferably has a metal cover, in particular of stainless steel, wherein an air gap for the thermal isolation is created between the metal and the aluminum heating block.

The second process device 4 preferably also has a cooling and/or heating device. The functional region of the second process device 4 is preferably also embodied as hollow space in the cooling and/or heating device, which has a diameter of preferably more than 30 mm or of more than 32 mm or of more than 34 mm or of more than 36 mm or of more than 37 mm or of more than 38 mm or of more than 39 mm, in particular of up to 50 mm or of up to 48 mm or of up to 46 mm or of up to 44 mm or of up to 42 mm, in particular of 40 mm or of substantially 40 mm or of exactly 40 mm. The second process device preferably has at least one slave printed circuit board arrangement and/or at least one power/communications interface and/or at least one heat exchanger and/or a USB interface. Preferably, the second or middle process device 4, respectively, additionally or alternatively has an aluminum heating block and/or one or a plurality of sensor elements, in particular a temperature sensor element, in particular a Pt100 block temperature sensor element. The heat exchanger is preferably embodied in a plurality of parts, in particular in two parts. One part of the heat exchanger is preferably in each case arranged on/at one of two opposite sides. The middle process device 4 can preferably be coupled to the fluid line of the supply device 2, whereby, particularly preferably, the functional fluid, in particular cooling water, which is provided by the supply device 2, can be guided through the process device 4. The heating device is preferably also embodied in a plurality of parts, in particular of two parts. One part of the resistance heater is preferably in each case arranged on/at one of two opposite sides of the functional region 14 for an improved heat distribution. The slave printed circuit board arrangement preferably has a power and/or communications interface to the data, energy and/or signal supply bus line 12. Furthermore, a data protocol, in particular a USB protocol, is preferably used in order to provide a "plug and play" functionality. Thanks to the "plug and play" functionality, the process device 4 can be digitally controlled and/or operated and/or manipulated and/or read in any receiving means 6. The middle process device 4 preferably has a metal cover, in particular of stainless steel, wherein an air gap, in particular for the thermal isolation, is preferably created between the metal cover and the aluminum heating block.

The right or third process device 4, respectively, is substantially embodied according to the second or middle process device 4, respectively, wherein the hollow space or receiving space, respectively, or functional region 14, which is embodied in the region of the cooling and/or heating device, has a diameter of preferably more than 50 mm or of more than 51 mm or of more than 52 mm or of more than 53 mm or of more than 54 mm or of more than 55 mm or of more than 56 mm, in particular of up to 65 mm or of up to 63 mm or of up to 62 mm or of up to 60 mm or of up to 58 mm, in particular of 57 mm or of substantially 57 mm or of exactly 57 mm.

In the case of five receiving means 6 per row 30, 32 (see FIG. 1), preferably five process devices can be arranged in accordance with the first process device (FIG. 2, left process device). It is further possible that only three process devices 4 can be arranged per row, as soon as the larger process devices 4 (see FIG. 2, middle and right process device) comprising hollow space diameters of approx. 40 mm and 57 mm are used. When using the larger process devices 4, the process device can preferably be coupled to the supply device 2 via the first, third and fifth receiving means 6 (first, middle and last receiving means 6 in a row formed of five receiving means 6). In this case, no process devices are then preferably coupled to the supply device 2 via the second and fourth receiving means 6.

Figure 3A:
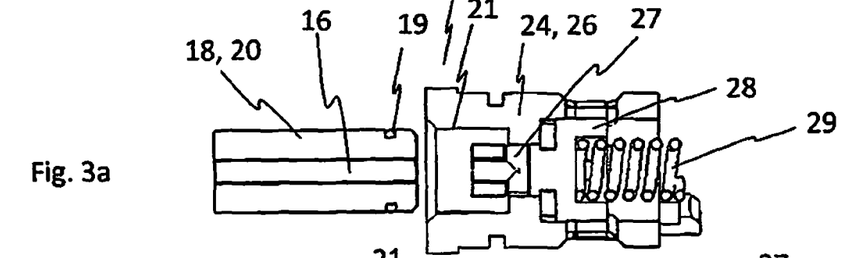
FIGS. 3a-3c show the process for forming a fluid connection between a process device and a supply device in a schematic manner.
Figure 3B:
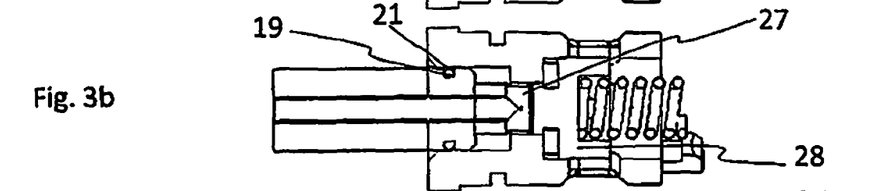
Figure 3C:
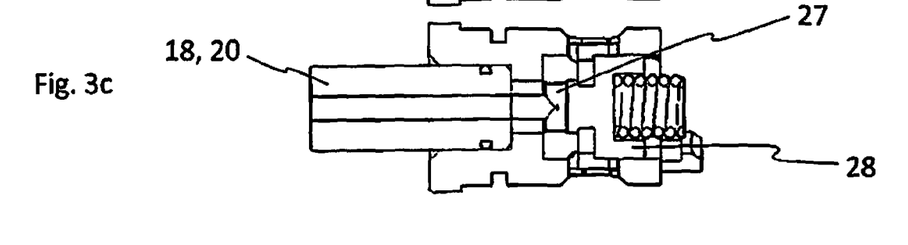

FIGS. 3a to 3c show the sequence, which follows in response to the coupling of a process device 4 to the supply device 2. The process device 4 has the two coupling means 18, 20, which penetrate into the supply ports 8, 10, which are spaced apart from one another, of the supply device 2. The inflow coupling means 18 and the outflow coupling means 20 thereby in each case embody a line element 16, which has a sealing means 19, in particular an O-ring, in the region of one end.

FIG. 3b shows that the sealing means 19 is brought into an operative connection with an inner wall or an effective area 21 of the valve device 24, 26, respectively, in such a manner that a sealed space is created, from which no fluid can escape into the environment. The inflow coupling means 18 and the outflow coupling means 20 are in each case brought into contact with a displaceably arranged line element 27, in each case preferably simultaneously or substantially simultaneously, by means of a further displacement movement. The line element 27 thereby preferably contacts a locking part 28 at least temporarily or is a part of the locking part 28. A restoring force is applied to the locking part 28 by means of a spring device 29, in particular a compression spring. The spring device 29 has the effect that the fluid line is interrupted in response to the decoupling of a process device 4 from the supply device 2, and thus no or only small leakages, respectively, appear.

FIG. 3c shows that the line element 27 is displaced against the spring force by means of the inflow coupling means 18 and the outflow coupling means 20, whereby a fluid communication path is opened and the functional fluid can be exchanged between the process device 4 and the supply device 2.

This arrangement has the advantage that a fluid-tight connection is initially established in response to the coupling of the process device 4 to the supply device 2, before a fluid exchange is made possible. This is also significant for the decoupling process, because the fluid seal is hereby maintained (in response to the removal of the inflow coupling means 18 and of the outflow coupling means 20 from the valve devices 24, 26) until the fluid communication path is closed again. The decoupling or closing process, respectively, is reversed to the coupling or opening process, respectively.

The valve devices 24, 26 thus open automatically when a process device 4 is coupled to the supply device, and close automatically when a process device 4 is decoupled from the supply device 2.

Particularly preferably, the fluid line in the supply device 2 also has one, exactly one or at least one bypass valve device. The bypass valve device protects against a water pressure rise in the event that a water feed for the purpose of circulation or flowing through the supply device 2, respectively, takes place and that all process devices 4 are decoupled from the supply device.

A coupling or decoupling, receptively, between the data, energy and/or signal supply port 12 and the data, energy and/or signal coupling means 22 furthermore also preferably takes place simultaneously to the coupling or decoupling, respectively, of the fluid connection between the process device 4 and the supply device 2.

All process devices 4 are preferably equipped with interfaces, which provide for the supplementation of additional functions or devices, such as, e.g. the connection of modular cameras and/or sensor devices, in particular infrared sensor devices.

Figure 4:
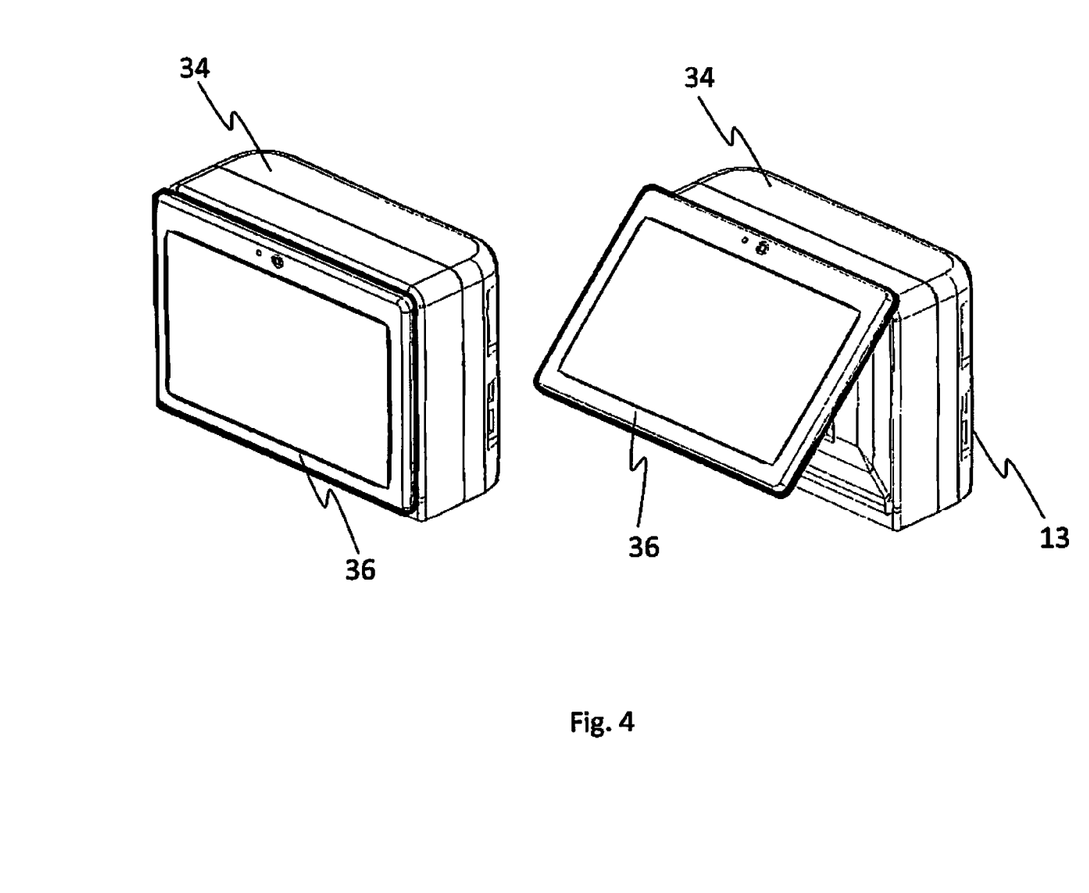
FIG. 4 shows perspective illustrations of a control device with corresponding input and/or output device.

FIG. 4 in each case shows a control device 34 comprising an input and/or display device 36 arranged thereon. The control device 34 preferably furthermore has a cast or injection molded plastic housing, respectively. The control device 34 preferably has processor components, in particular a preferably enclosed PC, which is embodied for executing an operating system, such as, e.g. Windows or IOS. Provision is preferably made on the control device 34 for one or a plurality of communication interfaces 13, such as ports for connecting external devices, in particular one or a plurality of USB ports and/or one or a plurality of j45 ports and/or card readers. The control device 34 preferably has an input and display device 36, in particular in the form of a touch screen. The input and display device 36 can hereby be a fixed part of the control device 34. The input and display device 36, however, is preferably designed in such a manner that it can exchange data with the control device 34 in a wireless manner. The input and/or display device 34 can hereby be coupled to the supply device 2 via a display holding device 48 (see FIG. 1). The display can preferably be inclined at an angle of inclination range of between 0° and 60° C., in particular of 45°, with respect to the control device 34 by means of the display holding device 48. Particularly preferably, the change of inclination can be set continuously or in stages of between 1° and 10°, in particular in stages of 5°. For setting the inclination in stages, provision is preferably made for a click-stop mechanism. The display holding device 48 is preferably designed in such a manner that the orientation, in particular the inclination, of the input and display device 36 can be set or is predetermined with respect to the supply device 2. The software of the control device is preferably designed in such a manner that functions can be selected or controlled, respectively, or set, respectively, via a menu structure. The individual process devices 4, which are coupled to the supply device 2, can further be monitored. The profiles and/or graphs relating to the procedures or processes, respectively, of the individual or of individual process devices 4 are preferably displayed or output, respectively.

Figure 5:
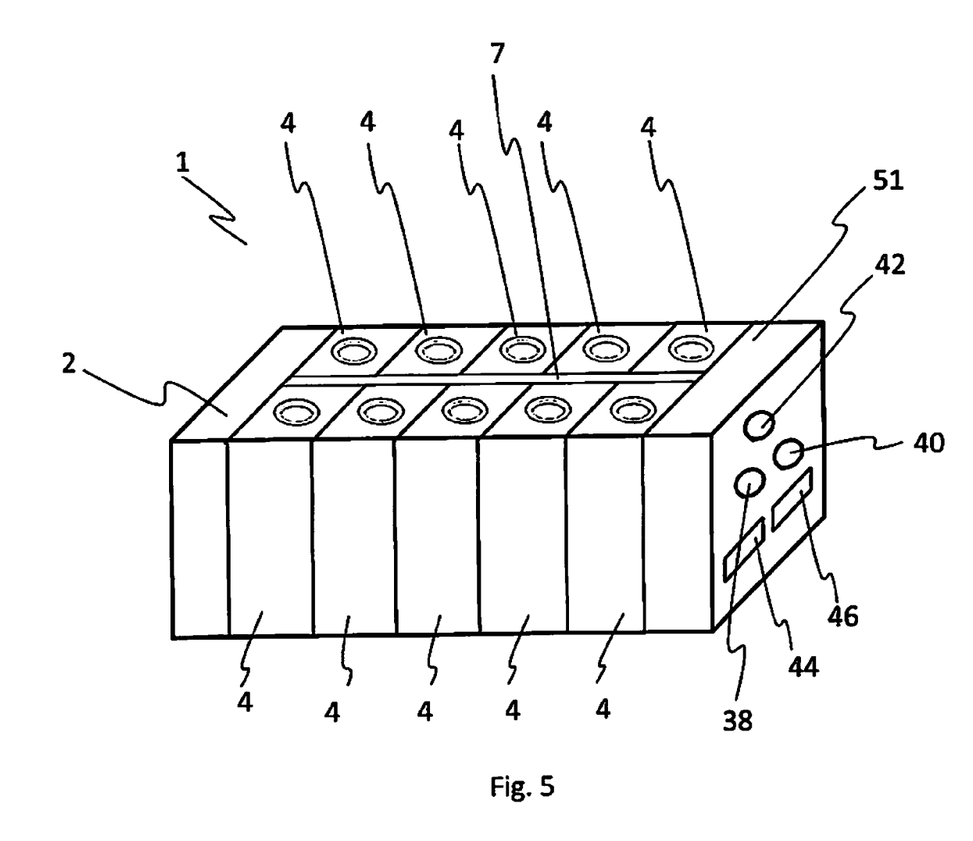
FIG. 5 shows a schematic illustration of an exemplary modular device according to the invention for the treatment and/or analysis of substances.

According to FIG. 5, the functional fluid can be introduced into and discharged from a supply part 51 of the supply device 2 via a main fluid inlet 38 and a main fluid outlet 40. The supply part 51 hereby preferably consists of cast or injection molded, respectively, synthetic or plastic, respectively, and is preferably fixedly connected to the wall device 7. During operation of the modular device 1 according to the invention, a fluid exchange preferably takes place temporarily or continuously via the main fluid inlet 38 and the main fluid outlet 40, wherein the functional fluid is particularly preferably circulated inside the supply device. Reference numerals 44, 46 further identify interfaces, in particular analog or digital interfaces. The data interface 44 is preferably embodied for acquiring data of every process device 4, which is coupled to the supply device 2, wherein it is additionally or alternatively possible that individual or all process devices 4 can be controlled by means of the data interface. It is further possible that updates of the software, which is executed by means of the control device 34, can be made by means of the data interface. The interface 46 is preferably designed in such a manner that a multi-channel thermometer and/or a multi-channel IR circuit board can be coupled to the supply device 2. The multi-channel thermometer is preferably a 10-channel thermometer and the multi-channel IR circuit board is a 10-channel IR circuit board. The supply device 2 preferably furthermore has a power connection 42 for operating the modular device 1. It is also possible that an interface exists to a printed circuit board, via which one or a plurality of further devices can be connected to the supply device 2.

The supply device 2 thus represents a standard device, which can particularly preferably be supplemented by one or a plurality of process devices 4 of a different size and/or function.

The process devices 4, the control device 34 and/or the supply part 51 are preferably designed in such a manner that they can be supplemented by further functions and/or devices at a later point in time.

According to the invention at hand, the individual process devices 4 can preferably always be decoupled from the supply device 2, without having to stop a cooling means circulation or having to isolate the cooling means circuit.

The invention thus refers to a modular device for the treatment and/or analysis of substances, in particular for chemical and/or pharmaceutical processes, at least comprising a supply device 2, which supplies at least one process device 4 for the treatment and/or analysis of substances with at least one functional fluid, wherein the supply device 2 preferably has two rows, each comprising five receiving means 6 in each case for receiving one process device 4. The receiving means 6 thereby preferably in each case have a plurality of supply ports 8, 10, 12, wherein the supply ports 8, 10, 12 of preferably at least two receiving means 6 are arranged so as to be oriented identically to one another, wherein each receiving means 6 has at least two supply ports 8, 10 for the transmission of a functional fluid.

The process device 4 preferably has a functional region 14 for the treatment and/or analysis of substances, a fluid line 16, which encloses the functional region 14 at least in sections, and a plurality of coupling means 18, 20, 22 for coupling to the plurality of supply ports 8, 10, 12 of the receiving means 6, wherein, by means of an inflow coupling means 18 and an outflow coupling means 20, fluid communication between an inflow supply port 8 for feeding the functional fluid to the process device 4 and an outflow supply port 10 for receiving the functional fluid to be led out of the process device 4 can be created via the fluid line 16.

A first valve device is 24 is preferably provided in the region of the inflow supply port 8 and a second valve device 26 is preferably provided in the region of the outflow supply port 10, wherein the first valve device 24 can be actuated by means of the inflow coupling means 18 and the second valve device 26 can be actuated by means of the outflow coupling means 20, wherein the first valve device 24 and the second valve device 26 of a receiving means 6 are closed when the receiving means 6 is decoupled from a process device 4, and wherein the first valve device 24 and the second valve device 26 of the receiving means 6 are open when the receiving means 6 is coupled to a process device 4.

REFERENCE LIST 1 modular device
2 supply device
4 process device
6 receiving means
7 wall device
8 inflow supply port
10 outflow supply port
12 data, energy and/or signal supply port
13 communication interface
14 functional region
16 fluid line
18 inflow coupling means
19 sealing means
20 outflow coupling means
21 effective area
22 data, energy and/or signal coupling means
24 first valve device
26 second valve device
27 movable line element
28 locking part
29 spring element
30 first row
32 second row
34 control device
36 input and display device
38 main fluid inlet
40 main fluid outlet
42 power connection
44 data interface
46 interface
48 display holding device
50 display
51 supply part

The invention claimed is:

1. A modular device for treatment and/or analysis of substances, the modular device comprising:
a supply device configured to supply at least one process device for the treatment and/or analysis of substances with at least one functional fluid,
wherein the supply device has a plurality of receiving means in each case for receiving one process device,
wherein the receiving means in each case have a plurality of supply ports, wherein the supply ports of at least two receiving means are arranged so as to be oriented identically to one another, wherein each receiving means has at least two supply ports for the transmission of a functional fluid, the at least two supply ports comprising an inflow supply port and an outflow supply port,
wherein each of the at least one process device has a functional region for the treatment and/or analysis of substances, a fluid line, which encloses the functional region, and a plurality of coupling means for coupling to the plurality of supply ports of one of the receiving means, wherein, by means of an inflow coupling means and an outflow coupling means of the plurality of coupling means of a process device, fluid communication between an inflow supply port for feeding the functional fluid to the process device and an outflow supply port for receiving the functional fluid to be led out of the process device can be created via the fluid line,
wherein, for each receiving means, a first valve device is provided in a region of the inflow supply port and a second valve device is provided in a region of the outflow supply port, wherein the first valve device can be actuated by means of the inflow coupling means of a process device and the second valve device can be actuated by means of the outflow coupling means of a process device, wherein the first valve device and the second valve device of a receiving means are closed when the receiving means is decoupled from a process device, and wherein the first valve device and the second valve device of the receiving means are open when the receiving means is coupled to a process device.

2. The modular device according to claim 1, wherein,
for generating the coupling between the first valve device and the inflow coupling means, the inflow coupling means can be positioned in such a manner with respect to the first valve device that a fluid-tight connection is created between the first valve device and the inflow coupling means, wherein, while maintaining the fluid-tight connection, a displacement movement of the inflow coupling means can be effected in such a manner with respect to the first valve device that, by means of a contact with the inflow coupling means, a locking part of the first valve device can be deflected from a position, which prevents fluid communication from the supply device, into a position, which allows for fluid communication from the supply device, and
for creating the coupling between the second valve device and the outflow coupling means, the outflow coupling means can be positioned in such a manner with respect to the second valve device that a fluid-tight connection between the second valve device and the outflow coupling means is created, wherein, while maintaining the fluid-tight connection, a displacement movement of the outflow coupling means can be effected in such a manner with respect to the second valve device that a locking part of the second valve device can be deflected by means of a contact with the outflow coupling means from a position, which prevents a fluid communication into the supply device, into a position, which allows for a fluid communication into the supply device.

3. The modular device according to claim 1 wherein
the receiving means in each case have at least one data, energy and/or signal supply port, wherein the data, energy and/or signal supply ports of the individual receiving means are in each case arranged identically with respect to the inflow supply ports and the outflow supply ports of the respective receiving means, wherein each of the at least one process device has a data, energy and/or signal coupling means, which is arranged in such a manner that a data, energy and/or signal exchange can be effected via a data, energy and/or signal supply port of a receiving means when the inflow supply port of the receiving means is coupled to the inflow coupling means and when the outflow supply port of the receiving means is coupled to the outflow coupling means.

4. The modular device according to claim 1 wherein the supply device has at least two rows, each comprising a plurality of adjacent receiving means, wherein at least two receiving means are provided per row, wherein at least the receiving means of one row are connected to a common feed line for feeding the functional fluid and to a common discharge line for discharging the functional fluid.

5. The modular device according to claim 1 wherein the at least one process device comprises at least two process devices, which differ structurally and/or functionally, wherein functionally corresponding coupling means of the at least two process devices are arranged so as to be oriented identically to one another.

6. The modular device according claim 3 wherein a control device is arranged or can be arranged in or on the supply device, wherein the control device can identify each of the at least one process device independent from a respective receiving means, wherein each of the at least one process device can be controlled and/or read by means of the control device, and wherein the data, energy and/or signal supply ports of the plurality of receiving means are connected to the control device.

7. The modular device according to claim 6 wherein the control device can be operated by means of an input and display device, wherein the control device and the input and display device can be connected to one another wirelessly for the exchange of data.

8. The modular device according to claim 1 wherein the supply device
   has a main fluid inlet for introducing the functional fluid into the modular device, and a main fluid outlet for letting the functional fluid out of the modular device and/or
   has a power connection for energy absorption and/or
   has a data interface for reading and/or controlling the modular device and/or
   has an interface for connecting a multi-channel thermometer and/or a multi-channel infrared circuit board.

9. The modular device according to claim 4 wherein all receiving means are connected to the common feed line and to the common discharge line.

10. The modular device according to claim 4 wherein at least five receiving means are provided per row.

11. The modular device according to claim 10 wherein all receiving means are connected to the common feed line and to the common discharge line.

* * * * *